US006664757B1

(12) United States Patent
Gauthier et al.

(10) Patent No.: US 6,664,757 B1
(45) Date of Patent: Dec. 16, 2003

(54) METHOD AND ASSEMBLY FOR SELECTIVELY CHARGING A HIGH VOLTAGE VEHICULAR BATTERY

(75) Inventors: Greg Edward Gauthier, Dearborn, MI (US); Patrick Daniel Maguire, Ann Arbor, MI (US); Renuka Vikram Gokhale, Farmington Hills, MI (US); Venkateswa Anand Sankaran, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/064,196

(22) Filed: Jun. 20, 2002

(51) Int. Cl.[7] .............................................. H01M 10/46
(52) U.S. Cl. ..................................................... 320/103
(58) Field of Search ................................ 320/103, 104, 320/124, 125, 128, 137, 152, 157, 159, 162

(56) References Cited

U.S. PATENT DOCUMENTS

| 5,481,175 A | * | 1/1996 | Qualich et al. |
| 5,592,067 A | * | 1/1997 | Peter et al. |
| 5,811,958 A | * | 9/1998 | Yamamoto |

* cited by examiner

*Primary Examiner*—Edward H. Tso
(74) *Attorney, Agent, or Firm*—John Chupa

(57) ABSTRACT

A hybrid vehicle 10 which includes an assembly 13, a low voltage battery 14, and a high voltage battery 12. Particularly, the assembly 13 allows the on board low voltage battery 14 or another low voltage donor battery to recharge the high voltage battery 12 in an efficient manner while concomitantly reducing the likelihood that the high voltage battery 12 will be unnecessarily or inadvertently recharged while concomitantly ascertaining the existence of a fault within the high voltage battery 12 and preventing charge from being communicated to the high voltage battery 12 when such a fault has been detected.

20 Claims, 2 Drawing Sheets

METHOD AND ASSEMBLY FOR SELECTIVELY CHARGING A HIGH VOLTAGE VEHICULAR BATTERY

BACKGROUND OF INVENTION

1. Field of the Invention

The present invention generally relates to a method and an assembly for selectively charging a high voltage vehicular battery by the use of a low voltage battery and to a vehicle which incorporates the method and the assembly and more particularly, to a method and an assembly which quickly and efficiently charges a relatively high voltage vehicular battery while reducing the likelihood of an inadvertent or unnecessary charging of the high voltage vehicular battery while concomitantly ascertaining the existence of a fault within the high voltage vehicular battery and preventing charge from being communicated to the high voltage vehicular battery should a fault be detected.

2. Background of the Invention

A hybrid vehicle typically includes a high voltage battery (e.g., a battery which supplies energy or potential energy of about three hundred volts) and a relatively low voltage battery (e.g., a battery which supplies energy or potential energy of about twelve volts). Particularly, the high voltage battery is typically used to operate a motor/generator assembly which selectively provides torque to the wheels of the vehicle, while the low voltage battery provides energy to the various devices and assemblies which operatively reside within the vehicle, such as a radio.

The high voltage battery must be recharged or receive electrical charge in the event that the high voltage battery becomes discharged or loses an amount of charge which causes the battery to fail to provide the necessary energy which is required to power the motor/generator assembly. Since there currently exists only a relatively small number of hybrid vehicles, the likelihood of quickly securing another high voltage battery or locating another hybrid vehicle whose high voltage battery may be used to jumpstart the disabled vehicle (by providing energy to the high voltage battery) is relatively small. Not only do these conventional strategies require a high voltage battery, they continue the recharging operation until the discharged or partially discharged high voltage battery is fully charged, thereby undesirably requiring a relatively large amount of time to complete the jumpstart operation. These strategies also provide electrical energy to the high voltage battery even when the energy will not charge the high voltage battery due to a fault which may exist within the high voltage battery. Moreover, these strategies also attempt to provide electrical energy to the high voltage battery even when such energy may not be needed by the high voltage battery (e.g., such as when the high voltage battery is fully charged or has an amount of charge greatly exceeding the threshold amount of charge needed to operate the motor/generator assembly). The present invention overcomes these disadvantages.

SUMMARY OF INVENTION

It is a first non-limiting advantage of the present invention to provide a method and an assembly for selectively charging a vehicular high voltage battery in a manner which overcomes some or all of the previously delineated disadvantages of prior strategies and methods.

It is a second non-limiting advantage of the present invention to provide a method and an assembly for selectively and quickly recharging a vehicular high voltage battery to an adequate level appropriate to allow the vehicle to start at a relatively slow speed.

It is a third non-limiting advantage of the present invention to provide a method and an assembly which reduces the likelihood that charge will be attempted to be communicated to a fully charged high voltage battery.

It is a fourth non-limiting advantage of the present invention to provide a method and an assembly for selectively and quickly recharging a vehicular battery and for quickly and efficiently detecting the presence of a fault within the battery, and for preventing charge to be communicated to the battery when such a fault is detected.

According to a fifth non-limiting advantage of the present invention, an assembly for selectively charging a first battery is disclosed which operatively provides a first voltage signal having a first amplitude by the use of a second battery which operatively provides a second voltage signal having a second amplitude. Particularly, the assembly includes a charger which is coupled to the first battery, which selectively receives the second voltage signal, which converts the second voltage signal to a third voltage signal having an amplitude which is equal to the first amplitude, and which communicates the third voltage signal to the first battery, and a controller which is coupled to the charger, which detects the presence of a fault within the first battery and which allows the third voltage signal to be communicated to the first battery in the absence of a fault within the first battery and for a time necessary to partially charge the first battery.

According to a sixth non-limiting advantage of the present invention, a vehicle is provided having a first battery providing a first voltage signal having a first amplitude and a second battery providing a second voltage signal having a second amplitude. Moreover, the vehicle includes a charger which is coupled to the first and second batteries, which receives the second voltage signal, and which converts the second voltage signal to a third signal having the first amplitude, and a controller assembly which is coupled to the charger and which selectively causes the third voltage signal to be communicated from the charger to the first battery for a certain period of time sufficient to partially charge the first battery.

According to a seventh non-limiting advantage of the present invention, a method is disclosed of charging a battery which is operatively disposed within a vehicle of the type having a selectively positionable ignition switch. Particularly, the method includes the steps of determining whether the battery requires a predetermined amount of electrical charge; and causing only a portion of the predetermined amount of required charge to be communicated to the battery and when the ignition switch resides in an off position.

These and other features and advantages of the present invention will become apparent from a reading of the following detailed description of the preferred embodiment of the invention and by reference to the following drawings.

DETAILED DESCRIPTION

Figure 1:
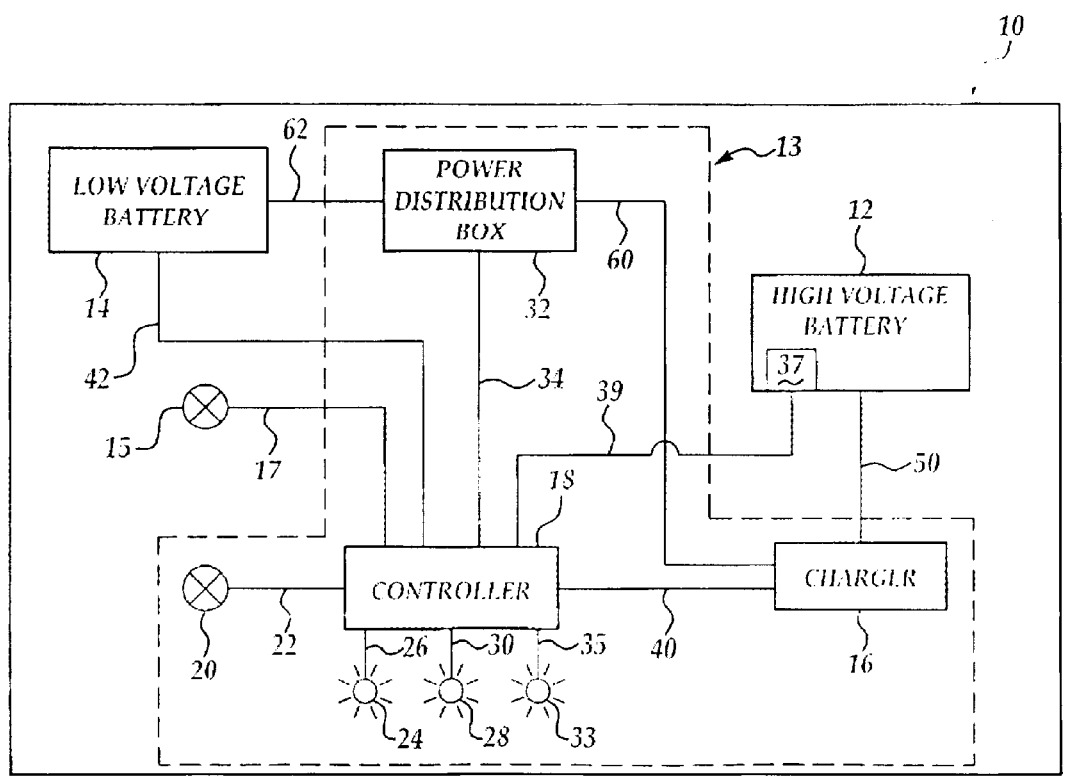
FIG. 1 is a block diagram of a hybrid electric vehicle which incorporates an assembly which is made in accordance with the teachings of the preferred embodiment of the invention.

Referring now to FIG. 1, there is shown a hybrid vehicle 10 which is made in accordance with the teachings of the preferred embodiment of the invention. Particularly, the hybrid vehicle 10 includes a high voltage battery 12, such as but not limited to a battery providing a voltage signal having an amplitude of about three hundred volts, a low voltage battery 14, such as but not limited to a battery providing a voltage signal having a amplitude of about twelve volts, a selectively movable ignition switch 15, and an assembly 13 which is made in accordance with the teachings of the preferred embodiment of the invention. It should be appreciated that only the relevant portions of the hybrid vehicle 10 are shown in FIG. 1 and that the principles of the present invention may be applied to a wide variety of dissimilar vehicular configurations.

As shown, assembly 13 includes a charger assembly 16 which is adapted to receive a voltage signal having an amplitude of about twelve volts and to output a voltage signal having an amplitude of about three hundred volts, a controller 18 which is operable under stored program control, a selectively movable switch 20 which is coupled to the controller 18 by the use of bus 22, a first selectively energizable member 24 which is coupled to the controller 18 by the use of bus 26, a second selectively energizable member 28 which is coupled to the controller 18 by the use of bus 30, a third selectively energizable member 33 which is coupled to the controller 18 by the use of bus 35, and an electric current sensor 37 which is coupled to a state of charge estimator (not shown) which resides within controller 18, by the use of bus 39. Particularly, the charge estimator may be embodied within software, firmware, and/or hardware which is contained within the controller 18. Moreover, the current sensor 37 detects the amount of electrical current which emanates from or is received by the high voltage battery 12 and provides this information to the controller 18 by the use of bus 39. The charge estimator uses this electrical current information to estimate the amount of electrical charge which resides within the high voltage battery 12. Assembly 13 further includes a power distribution box or assembly 32 which is coupled to the controller 18 by the use of bus 34.

Figure 2:
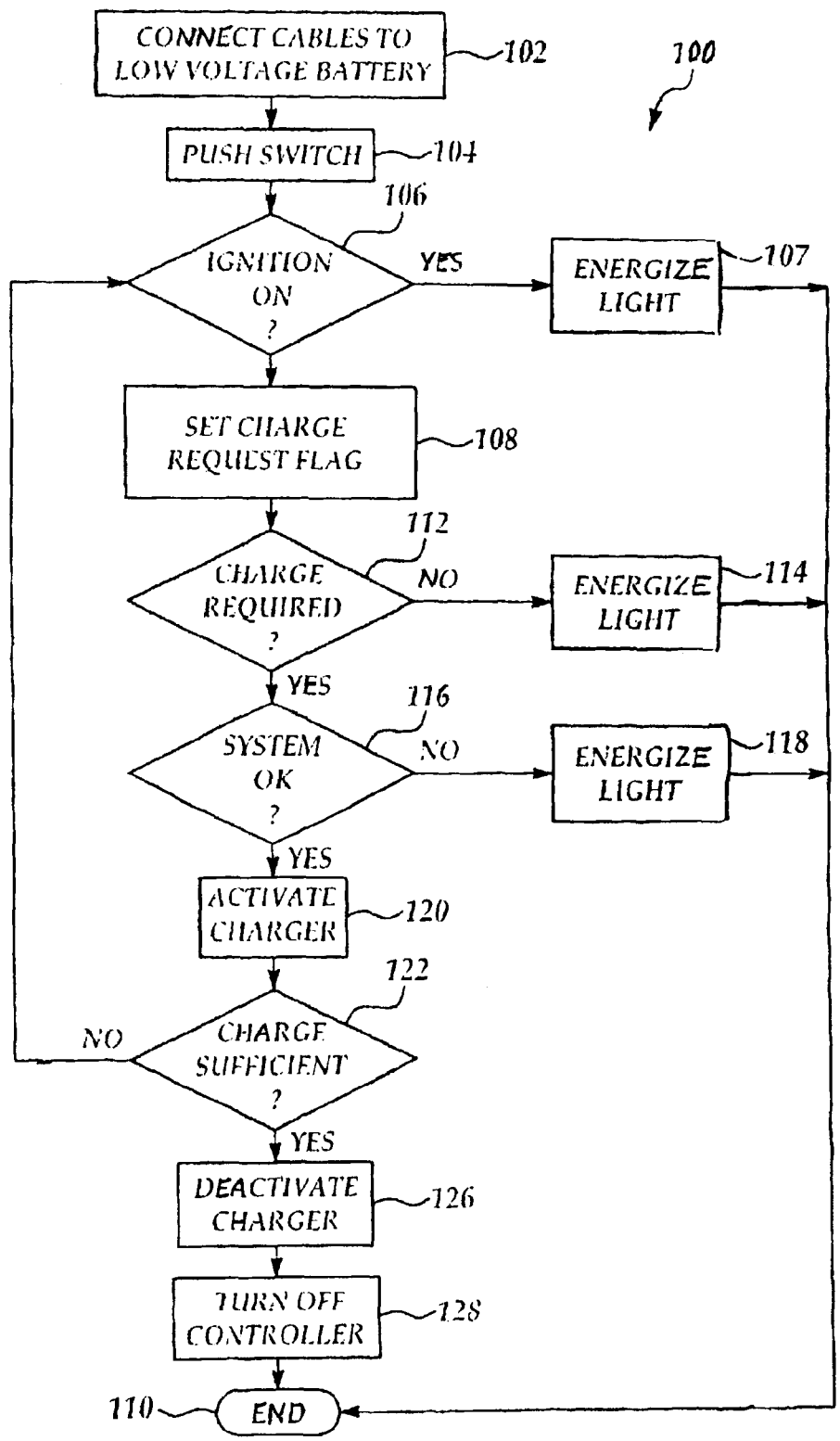
FIG. 2 is a flow chart comprising the various operational steps which comprise the methodology of the preferred embodiment of the invention.

As is further shown, controller 18 is coupled to the charger assembly 16 by the use of bus 40. The charger assembly 16 is coupled to the high voltage battery 12 by the use of the bus 50 and the charger assembly 16 is coupled to the power distribution box 32 by the bus 60. The low voltage battery 14 is coupled to the power distribution box 32 by the bus 62 and to the controller 18 by the bus 42, and the controller 18 is coupled to the selectively movable ignition switch 15 by the use of the bus 17. It should be realized that the principles of the present invention may be applied to a low voltage battery which provides a amount of voltage which may be lower or greater than about twelve volts and to a high voltage battery which provides an amount of voltage which may be lower or greater than about three hundred volts. The difference between the voltage provided by the low voltage battery and the voltage provided by the high voltage battery is significant. Referring now to FIG. 2, there is shown a methodology or flowchart 100 which comprises a sequence of operational steps which comprise the methodology of the preferred embodiment of the invention. Particularly, the methodology 100 includes a first step 102 in which a low voltage donor battery or source (not shown) is connected to low voltage battery 14.

Step 102 is followed by step 104 in which the switch 20 is moved and/or depressed. Such movement or depression causes the switch 20 to generate a signal on the bus 22 which is received by the controller 18. Upon receipt of the signal, the controller 18 performs step 106. Particularly, in step 106, the controller 18 determines, by the use of bus 17, whether the ignition switch 15 is in a deactivated or "off" position. If the controller 18 determines that the ignition switch 15 is in a deactivated or "off" position, controller 18 enters step 108 in which the controller 18 "sets" or enables a "charge request" flag. Alternatively, if the ignition switch is in the "on" or activated position, step 106 is followed by step 107 in which the controller 18 energizes the member or light assembly 24 by providing or sourcing electrical energy on the bus 26. Step 107 is followed by step 110 in which the methodology 100 is ended.

Step 108 is followed by step 112 in which the controller 18 determines whether electrical charge is actually required by the high voltage battery 12. In one non-limiting embodiment of the invention, this determination is made by querying the sensor 37 (e.g., if little or no current is emanating from the battery 12, the controller 18 determines that additional charge is needed by the battery 12). Alternatively, the controller 18 may calculate the state of charge of the high voltage battery 12 in a known and conventional manner by use of the charge estimator (not shown) in combination with the sensor 37. That is, each of the batteries 12,14 have the capacity to store a certain respective amount of electrical charge in order to be "fully charged" and these respective amounts are stored within the controller 18. The battery 12 requires a certain amount of charge, which may be less than its respective "fully charged" amount, to operate the motor/generator assembly. If the controller 18 determines that no additional charge is needed by the battery 12 to operate the motor/generator assembly, step 112 is followed by step 114 in which the controller 18 activates or energizes the light or member 28 by sourcing or providing electrical energy or voltage on the bus 30 from the battery 14 or from another source. Step 114 is followed by step 110. In this manner, the controller 18 substantially reduces the likelihood of or substantially prevents the inadvertent or unnecessary charging of the high voltage battery 12 by the movement of the switch 20.

If the controller 18 determines that the high voltage battery 12 is in need of charge (e.g., has an amount of charge which is less than the amount of charge necessary to operate the motor/generator assembly), step 112 is followed by step 116 in which the controller 18 determines whether a fault exists within the high voltage battery 12. This discernment may be made by reviewing the state of charge history of the high voltage battery 12 in order to determine whether the high voltage battery 12 has suddenly become discharged, thereby indicating a fault, or by the use of a conventional technique. If the controller 18 determines that a fault exists within the high voltage battery 12, the controller 18 enters step 118 from step 116. Particularly, in step 118, the controller 18 activates or energizes the light 33 by sourcing or providing electrical power to the light 33, from the battery or another source, by the use of bus 35. Step 118 is followed by step 110.

If the controller 18 determines that a fault does not exist within the high voltage battery 12, step 116 is followed by step 120 in which the controller 18 activates the charger assembly 16 by the use of command signals which are created by the controller 18 and communicated to the charger assembly 16 by the use of bus 40. In this manner, the charger assembly 16 uses the energy from the low voltage donor battery, converts this received voltage signal to a high voltage amplitude signal, and provides this converted voltage signal to the high voltage battery 12. Step 122 follows step 120 and, in this step 122, the controller 18 determines, by the use of sensor 37 or by other techniques, when the high voltage battery 12 has received a sufficient amount of charge to operate the motor/generator assembly. In the preferred embodiment of the invention, the controller 18 only allows the high voltage battery 12 to contain about one-half of its allowable or maximum amount of charge, (e.g., about one half of its full operating charge), thereby allowing the recharging operation to be quickly and efficiently accomplished. Only such a relatively low amount of charge is required since, in the preferred embodiment of the invention, the vehicle 10 is subsequently started at a relatively low engine speed.

If it is determined in step 122 that the high voltage battery 12 has not been sufficiently charged, step 122 is followed by step 106. Alternatively, step 122 is followed by step 126 in which the controller 18 deactivates the charger 16 by the use of commands which are created by the controller 18 and communicated to the charger assembly 16, by the use of bus 40. Step 126 may, in one non-limiting embodiment, be followed by step 128 in which the controller 18 may be allowed to enter a "sleep mode" or low energy consumption state in order to conserve electrical power. Alternatively, step 126 is followed by step 110. Step 128 is also followed by step 110. In this "sleep mode" embodiment, the controller 18 is awakened or consumes enough electrical power from the low voltage battery 14 to fully operate, upon the depression of the movement of the switch 20 in step 104.

It is to be understood that the present invention is not limited to the exact construction or method which has been discussed above, but that various changes and modifications may be made without departing from the spirit and the scope of the invention as is more fully delineated in the following claims. It should be further realized that the use of an "onboard" charger assembly 16 allows a low voltage donor battery (or even the onboard low voltage battery 14) to selectively charge the high voltage battery 12, thereby allowing a "self jumpstart" operation to be quickly and efficiently accomplished and obviating the need to search for a "donor vehicle" or a "donor battery". Moreover, it should be realized that light members 24, 28 and 33 may be replaced by a single light or a single multicolor light assembly.

What is claimed is:

1. An assembly for selectively charging a first battery which operatively provides a first voltage signal having a first amplitude by the use of a second battery which operatively provides a second voltage signal having a second amplitude, wherein said assembly comprises a charger which is coupled to said first battery, which selectively receives said second voltage signal, which converts said second voltage signal to a third voltage signal having said first amplitude, and which communicates said third voltage signal to said first battery; and a controller which is coupled to said charger, which detects the presence of a fault within said first battery, and which allows said third voltage signal to be communicated to said first battery in the absence of a fault within said first battery and for a time necessary to partially charge said first battery.

2. The assembly of claim 1 wherein said controller detects the position of an ignition switch and allows said first battery to receive said third voltage signal from said charger when said ignition switch is in a predetermined position.

3. The assembly of claim 2 wherein said assembly further comprises a selectively positionable member which is coupled to said controller and which causes said controller to allow said charger to receive said second voltage signal from said second battery when said member is moved to a predetermined position.

4. The assembly of claim 3 wherein said controller determines whether said first battery has a predetermined amount of charge and wherein said controller allows said first battery to receive said third voltage signal from said charger if said first battery has an amount of charge which is less than said certain amount of charge.

5. The assembly of claim 4 wherein said first voltage signal has an amplitude of about three hundred volts and wherein said second voltage signal has an amplitude of about twelve volts.

6. The assembly of claim 4 further comprising a selectively energizable light which is coupled to said controller and which is energized by said controller when said amount of charge is greater than said predetermined amount.

7. The assembly of claim 2 wherein said certain position comprises a deactivated position.

8. A vehicle comprising a first battery providing a first voltage signal having a first amplitude; a second battery providing a second voltage signal having a second amplitude; a charger which is coupled to said first and second batteries, which receives said second voltage signal and which converts said second voltage signal to a third signal having said first amplitude; and a controller assembly which is coupled to said charger and which selectively causes said third voltage signal to be communicated from said charger to said first battery for a predetermined period of time sufficient to partially charge said first battery.

9. The vehicle of claim 8 further comprising a selectively movable member which is coupled to said controller and which, when moved to a predetermined position, causes said controller to allow said third signal to be communicated from said charger to said first battery.

10. The vehicle of claim 9 wherein said first battery has a predetermined amount of electrical charge and wherein said controller allows said third signal to be communicated to said first battery only after said controller ascertains the amount of electrical charge residing within said first battery.

11. The vehicle of claim 10 comprising a selectively energizable member which is coupled to said controller and which is energized by said controller when said ascertained amount of electrical charge is greater than a predetermined value.

12. The vehicle of claim 11 wherein said selectively energizable member comprises a light.

13. The vehicle of claim 11 wherein said controller determines whether a fault exists within said high voltage battery before allowing said third voltage signal to be communicated to said first battery from said charger.

14. The vehicle of claim 13 further comprising a third selectively energizable member which is coupled to said controller and which becomes selectively energized by said controller upon the detection of a fault within said first battery.

15. The vehicle of claim 14 further comprising a selectively positionable ignition switch and wherein said controller determines the position of said selectively positionable ignition switch and allows said third signal to be communicated from said charger when said ignition switch is in a predetermined position.

16. The vehicle of claim 15 wherein said predetermined position comprises a deactivated position.

17. A method of charging a battery which is operatively disposed within a vehicle of the type having a selectively positionable ignition switch, said method comprising the steps of determining whether said battery requires a predetermined amount of electrical charge; and causing only a portion of said predetermined amount of required charge to be communicated to said battery when said ignition switch resides in an off position.

18. The method of claim 17 further comprising the steps of ascertaining the existence of a fault within said battery; and preventing said electrical charge from being communicated to said battery when a fault has been ascertained to exist within said battery.

19. The method of claim 17 further comprising the steps of providing a selectively energizable member; and energizing said selectively energizable member upon the detection of a fault within said battery.

20. The method of claim 19 further comprising the steps of providing a second selectively energizable member; and energizing said second selectively energizable member when said ignition switch resides in an activated position.

* * * * *